3,269,867
FUEL CELL
Arthur J. Fabel, Maspeth, and Edwin F. Rissman, Brooklyn, N.Y., assignor to Leesona Corporation, Warwick, R.I., a corporation of Massachusetts
No Drawing. Filed July 11, 1962, Ser. No. 209,266
3 Claims. (Cl. 136—86)

This invention relates to improved fuel cell electrodes and more particularly to oxidizing electrodes composed of silver and a member of the group consisting of thallium and indium.

A fuel cell is the commonly employed term to define a device which converts the energy of a chemical reaction between a fuel and oxidant directly into low voltage direct current electricity. In obtaining an efficient fuel cell the problems encountered are essentially problems of chemical kinetics. It is necessary that the reaction between the fuel and oxidant be accomplished in order that the amount of energy degraded into heat is as small as possible. At the same time the reaction rate of the cell must be high enough to economically produce sufficient current from a practical sized cell.

A typical cell comprises a fuel electrode, an oxidizing electrode, an electrolyte positioned between the electrodes and means for the introduction of fuel and oxidant to the respective electrodes. In operation, at the cathode side of the cell oxygen or air is forced through the oxidizing electrode where the oxidant reacts with electrolyte within the pores of the electrode. Hydroxyl ions and either free oxygen or water are formed, with the hydroxyl ions passing through the pores into the electrolyte where they are transferred to the anode. At the anode, or positive side of the cell, fuel enters and impinges on the electrode where a process of adsorption and de-adsorption occurs. The fuel molecules becoming disassociated with the positive part of the molecule reacting with the oxidant ions forming a neutral product and leaving the electrode electrically charged. The electric charges are drawn from the electrode through an external circuit.

Fuel cells are particularly attractive commercially due to their potential performance characteristics. Cells having an efficiency of from about 40–90% have been constructed which is far superior to the efficiency of a gas turbine which has a maximum efficiency of about 30% due to Carnot's heat law. Since the fuel cell is not governed by Carnot's heat law, theoretical efficiencies are not limited.

In commercial operation, however, a completely practical cell has not been devised, primarily due to the shortcomings of the cell electrodes. Thus, at the lower operating temperatures necessary for a completely practical cell, the known electrodes are not sufficientliy reactive or else become polarized. To date, a considerable amount of research has been carried out in an effort to obtain an efficient oxidizing electrode. Francis T. Bacon in U.S. Patent No. 2,716,670 has described bi-porous nickel electrodes having a surface coating of lithiated nickel oxide. These electrodes are highly resistant to corrosion and still readily conduct an electric current. It has been found however that in order to obtain efficient performance, cells employing the lithiated nickel oxide electrodes must be operated at temperatures above 150° C.

Accordingly, it is an object of the instant invention to provide improved oxidizing electrodes for fuel cells.

It is another object of this invention to provide an improved porous oxidizing electrode from a mixture of silver and a member of the group consisting of thallium and indium.

It is another object of the instant invention to provide a porous oxidizing electrode from a mixture of silver and a member of the group consisting of thallium and indium which is reactive at relatively low operating temperatures.

These and other objects of the invention will become more apparent from the following detailed description with particular emphasis being placed on the illustrative examples.

The instant electrodes are prepared from mixtures of silver and thallium or silver and indium. Thallium and indium are located in Group 3B of the Mendelejeff periodic table. The electrodes can be composed of from about 10–50%, by weight, of the Group 3B metal with the remainder of the composition being silver. It is, of course, apparent that minor amounts, that is, up to about 5% of a third element, such as palladium or platinum can be present without detrimentally effecting the electrodes performance. From all indications, it appears that mixtures of silver and thallium form solid solution alloys. Apparently, however, true inter-metallics are formed from mixtures of silver and indium.

The instant reducing electrodes can be substantially non-porous structures whereby the oxidizing gas is caused to flow against and around the electrode or the structure can be porous and the oxidizing gas pass through the electrode. The porous electrodes can be either homo-porous or bi-porous depending upon the ultimate use. The bi-porous electrodes are substantially more efficient in that the reaction interface where the oxidant reacts with the electrolyte is more easily controlled. The instant novel electrodes demonstrate improved polarization characteristics of up to about 50% and higher. The recovery from polarized conditions to open circuit potential is rapid and the electrodes are highly resistant to electrode poisoning.

Although the novel electrodes can be fabricated containing from about 10–50% of the Group 3B metal, superior results are obtained where the electrode employs indium, if from about 20–40% indium is used with the remainder of composition being silver. When thallium is selected, the preferred composition is from about 20–35% thallium with the remainder again being silver.

The instant reducing electrodes can be manufactured by preparations known in the art. Thus, the non-porous electrodes can be made by vacuum casting a mixture of silver and the Group 3B metal, cutting an electrode blank from the ingot and then fine polishing the blank. Alternatively and preferably porous electrodes are prepared by admixing powders of the alloys of the Group 3B and silver metals having a particle size of from about 1–100 microns, compacting and sintering to form a porous structure. More specifically, a porous electrode can be constructed by placing a ring with a lip of the proper thickness, usually from about 0.003 inch to about 0.30 inch, over an alumina coated disc, pressing the powder of the selected particle size on the disc and striking off the excess powder so that a layer of powder approximately the thickness of the lip remains. The powders are then compacted, as for example by vibratory techniques and sintered. In the compaction operation, the pressure at which the alloy powders are pressed can vary over a relatively wide range. Thus, compaction can be carried out at pressures as low as about 500 p.s.i. and as high as about 800 p.s.i.

The sintering of the electrodes after compaction can be carried out in any of the usual sintering furnaces, as for example, a retort inclined furnace. It is possible and often desirable to sinter the samples according to a predetermined cycle, thus, the cycle may consist of preheating to a temperature of about 200° F. for a short time and thereafter sintering at a temperature of from about 900–2000° F. for a relatively longer period of time before cooling. The sintering time can be varied, depending upon the sintering temperature. The sintering operation can be performed in an atmosphere of hydrogen or forming gas if desired, or it may be preferable to carry out the sintering operation in air or a vacuum.

It is possible by modification of the above techniques to prepare a bi-porous electrode structure. Thus, bi-porous structures can be prepared by placing a ring with a lip of the proper thickness, usually from about 0.003 inch to about 0.3 inch upon a suitable disc, filling said lip with a mixture of silver and Group 3B metal powders of selected particle size and striking off the excess powders so that a layer of powder approximately the thickness of the lip remains. A second ring with a lip again of a suitable size is placed over the previously described assembly and selected metal powders having a larger particle size than the first layer is carefully sifted into the ring and leveled off at the surface of the second ring. A cap is placed over the assembly and the powders are compacted and sintered as hereinbefore described. The resulting electrode is a bi-porous structure.

The reduction electrodes of the instant invention are usually employed in cells operating at temperatures of from about 20–180° C., and preferably at temperatures of from about 40–110° C. In the preferred temperature range, the cell exhibits a greater degree of reactivity and corrosion of the cell hardware is maintained at a minimum. Additionally, the temperature at which the cell is to be operated depends to a large extent upon the fuel employed in the fuel cell system as well as upon the anode which is selected.

The instant novel electrodes can be employed in fuel cells using known prior art electrolytes such as the aqueous alkaline solutions such as potassium hydroxide, sodium hydroxide, lithium hydroxide and mixtures thereof and the carbonates. Virtually any ionic conductor which remains substantially invariant under the operating conditions of the cell can be employed. Additionally, the electrodes can be operated with known oxidizing gases including pure oxygen or air. Again, while the electrodes are to be used primarily and are intended primarily as reducing electrodes it is possible that they may be employed as the anode of a fuel cell.

Having described the novel electrodes of the instant invention in general terms, Examples 1–3 inclusive set forth preferred embodiments of manufacturing the electrodes and demonstrate their use in a fuel cell system.

*Example 1*

A substantially non-porous electrode was prepared by charging 70 parts silver and 30 parts thallium into an evacuated quartz ampoule. The ampoule was placed in a rocking furnace and the temperature raised to 1025° C. and held for 45 minutes. Due to the rocking action of the furnace, a good mixture of the molten metals was obtained. The ampoule was slowly cooled to room temperature and an electrode blank cut from the ingot and mechanically polished.

The silver-thallium electrode was compared with a pure silver electrode in identical half-cell systems employing a 40% potassium hydroxide electrolyte and operating at a temperature of 40° C. The comparative half-cell values are given in Table 1:

TABLE 1

| $\mu a./cm.^2$ | Polarization (millivolts) | |
| --- | --- | --- |
| | Ag | Ag-Tl |
| 100 | 160 | 120 |
| 200 | 200 | 140 |
| 500 | 270 | 210 |

On open circuit voltage pure silver is 130 millivolts vs. calomel and the Ag-Tl is 98 millivolts.

*Example II*

A substantially non-porous electrode was prepared by charging 74 parts silver and 26 parts indium into an evacuated quartz ampoule. The ampoule was placed in a rocking furnace and the temperature raised to 1100° C. and held for 45 minutes. The rocking action of the furnace provided a good mixing of the molten metals. The ampoule was slowly cooled to room temperature and an electrode blank cut from the ingot and mechanically polished.

The silver-indium electrode was compared with a pure silver electrode in identical half-cell systems employing a 40% potassium hydroxide electrolyte and operating at a temperature of 40° C. Comparative half-cell values are given in Table 2.

TABLE 2

| $\mu a./cm.^2$ | Polarization (Millivolts) | |
| --- | --- | --- |
| | Ag | Ag-In |
| 100 | 160 | 45 |
| 200 | 200 | 64 |
| 500 | 270 | 110 |

On open circuit voltage Ag in 130 millivolts vs. calomel and Ag-In is 141 millivolts vs. calomel.

*Example III*

A homo-porous silver-indium electrode was constructed by charging an alloy powder composed of 65% silver and 35% indium and having a particle size of from about 5–8 microns to a ring with a 0.20 inch lip pressed over an alumina-coated disc. The alloy is made substantially as described in Example 2 and the ingot ground to obtain the proper particle size. The disc is laterally vibrated on a vibrator at an amplitude of 0.006 inch for 3 minutes. The disc is then sintered in an inclined retort furnace at a temperature of 1200° F. for 60 minutes in an atmosphere of hydrogen. The resultant structure is substantially homo-porous.

The electrode was tested in a 40% potassium hydroxide electrolyte at 40° C. as an oxygen cathode and demonstrated good electrochemical performance characteristics.

The novel electrode in Examples 1–3 did not show outward signs of corrosion or other deterioration after prolonged periods of time in 40% aqueous potassium hydroxide at temperatures up to as high as 150° C.

The illustrative examples are given as preferred embodiments only and the invention is not to be construed as being limited thereof. It is possible to produce still other embodiments of the invention without departing from the spirit thereof or the scope of the appended claims.

We claim:

1. A fuel cell for the direct generation of electrical current from a fuel and oxidant comprising a housing, a fuel electrode, an oxidizing electrode, an electrolyte in contact with said electrodes, and means for feeding fuel and oxidant respectively to said electrodes, at least the oxidizing electrode being a structure composed of silver and 20 to 40 percent by weight indium.

2. A fuel cell for the direct generation of electrical current from a fuel and oxidant comprising a housing, a fuel electrode, an oxidizing electrode, an electrolyte in contact with said electrodes, and means for feeding fuel and oxidant respectively to said electrodes, at least the oxidizing electrode being a structure composed of silver and 20 to 35 percent by weight thallium.

3. A fuel cell for the direct generation of electrical current from a fuel and oxidant comprising a housing, a fuel electrode, an oxidizing electrode, an electrolyte in contact with said electrodes and means for feeding fuel and oxidant to the respective electrodes, said oxidizing electrode comprising a structure composed of silver and a member of the group consisting of thallium and indium, said thallium and indium being present in an amount from 20 to 35 percent and 20 to 40 percent by weight respectively.

References Cited by the Examiner

UNITED STATES PATENTS 2,959,631    11/1960    Boswell _____ 136—120

FOREIGN PATENTS 871,950    7/1961    Great Britain.

JOHN H. MACK, *Primary Examiner.*

W. VAN SISE, *Assistant Examiner.*